Sept. 30, 1941.                E. LAU                    2,257,420
       ARRANGEMENT FOR DETERMINING THE DISTANCE OF AN OBSERVER
                      FROM PREDETERMINED OBJECTS
                         Filed Feb. 27, 1939
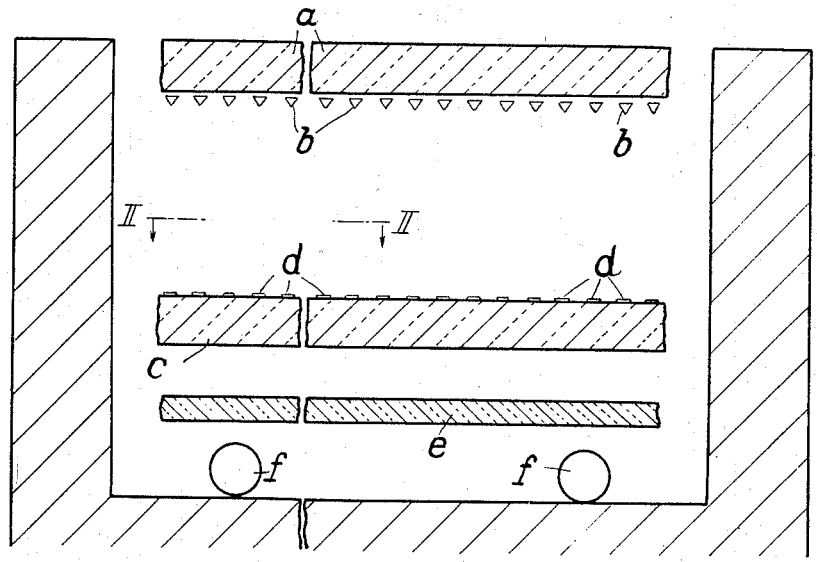
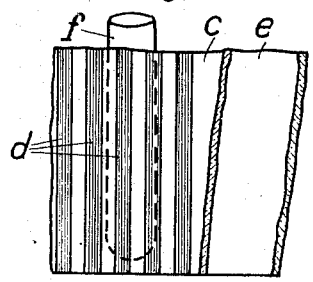
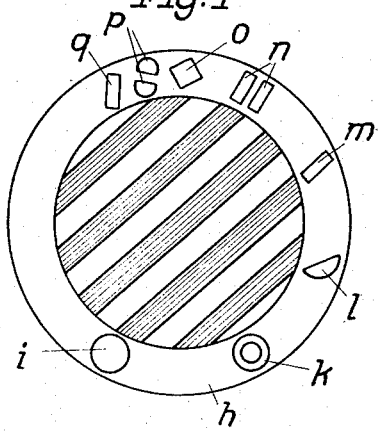
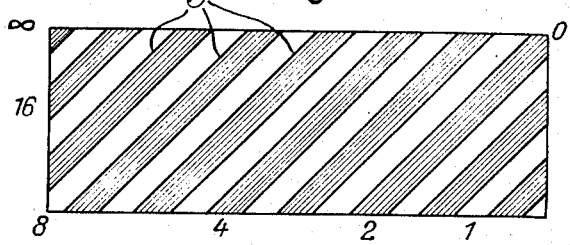
Inventor:
Ernst Lau,
By Potter, Pierce & Scheffler,
Attorneys.

Patented Sept. 30, 1941

2,257,420

UNITED STATES PATENT OFFICE 2,257,420

ARRANGEMENT FOR DETERMINING THE DISTANCE OF AN OBSERVER FROM PREDETERMINED OBJECTS

Ernst Lau, Berlin-Karow, Germany

Application February 27, 1939, Serial No. 258,861
In Germany October 1, 1937

4 Claims. (Cl. 88—1)

In determining the distance of an object from an observer it is common practice to use an instrument such as a so-called telemeter to be handled by the observer. This is not always very convenient, because it binds the hands or otherwise the agility of the observer by the necessity of handling the instrument.

Therefore it is an object of this invention to do away with this necessity, by making the object or the place, where it is positioned the carrier of indicating means, offering to a distant observer an optical phenomenon which varies depending from the distance, so that the different modifications of the optical phenomenon can be taken as criterion for the distance.

The invention makes use of the optical phenomenon occuring on inspection of two grids or screens with parallel bars, positioned one behind the other in the field of view of an observer. The free spaces between adjacent rods of the front grid are for the eyes of the observer more or less covered by rods of the back grid, whereas other rods of the back grid cover more or less rods of the front grid. The resulting image offers to the eyes of a distant observer stripes, which may be called superpositioned stripes, at a greater distance from each other than the distance of the rods of each individual grid, such superposition stripes appearing at such places, where a rod of the back grid is in the direction of vision from the observer behind a rod of the front grid. The superposition stripes are laterally displaced with relation to the concerned rod of the front grid, except the superposition stripes lying in the plane of vision which is perpendicular to the planes of the grids. The distance of the superposition stripes from each other increases with the distance of the observer from the planes of the grid rods. Thus the number of superposition stripes appearing in a predetermined section of the grid forms a criterion for the distance of the grid planes from the observer looking thereon.

The distance determination on ground of this criterion would however be unsatisfactory as well relating to convenience as relating to exactness, being based on counting the number of superposition stripes within a certain field of view.

The difficulty can be overcome by using the two grids in slight angular displacement. With two grids of which the rods are slightly angularly displaced with relation to each other, the increase of distance of the superposition stripes from each other with increasing distance of the observer from the grid planes is supplemented by progressive angular elevation of the superposition stripes with relation to a fixed direction. Thus instead of the number of superposition stripes appearing in a predetermined grid section, the angular elevation of the stripes with relation to a fixed direction may be used as criterion for the distance and consequently distance marks may be provided, indicating the distance corresponding to the several elevation angles of the superposition stripes.

In the foregoing the problem has only been considered under mere geometrical aspects. However, if instead of grates with solid rods of substantial thickness and conforming distance from each other, optical gratings or screens are used then the phenomenon of superposition stripes is or may be modified by light diffraction without however altering it in substance as far as the invention is concerned. In connection herewith it may be stated, that in order to carry through the invention even in the manufacture of small instruments for measuring short distances with screens or grates of transparent material such as glass, the values of the grid constants are much below those of really optic gratings, used for studying diffraction phenomena.

For a very light and handy instrument glass gratings have proved satisfactory, of which the lines and the intervals therebetween had a width of about 0.04 mm., whereas the distance of the gratings from each other was about 6 mm. With such gratings the lines thereon are no more perceived at a quite immaterial distance, so that they do not disturb the observation of the superposition stripes, whereas the superposition stripes can be easily perceived by the operator at distances for which an instrument of this kind may advantageously be used, say from 0.25 to 10 metres; the width of the stripes being from about 1.5 to 6 mm., depending from the distance.

Under certain conditions it may be advisable to use gratings or screens known to the physicists as "phase screens" instead of the usual "absorption screens." Whereas with "absorption screens" dark lines alternate with light and transparent interstices, the same effect is reached with "phase screens" by alternate lines of greater or minor optical thickness of the phase screen plate, the optical thicknesses of the lines differing by an amount equal to one half of a wave length. The light absorption by the dark lines of the screen being avoided with the phase screens, instruments according to the invention provided with phase screens yield greater light contrasts between superposition stripes and the surface whereon such stripes appear.

The invention is of value in a variety of situations of which some may be mentioned as follows:

In traffic it is important that vehicles avoid coming too close together, but it is difficult to estimate the distance particularly in darkness: a distance indicator, according to the invention, provided at the rear end of a vehicle would permanently indicate to the driver of another vehicle behind said first named vehicle, the distance therefrom, so that he would be guided thereby— in cinematographic and other photographic work, distances between the camera and the object to be photographed should exactly be controlled: the new distance indicator would allow this, without requiring any handling of an instrument—the pilot of an aircraft, when landing on the ground of an aerodrome must very exactly control the distance of his machine from the ground, but hitherto he can only make a very rough estimation: a device according to the invention, provided on the ground of the landing place, would assist him; here the above explained particularity of the novel method of distance indicating, according to which only the distance of the observer from the grid or screen plane is and can be indicated, but not the distance of the observer from the screen device itself, measured as the length of the rectilinear line of connection between the observer and the screen device is of importance in so far, as the pilot of the aircraft is before all interested to know his distance from ground and just this data is indicated by the new distance indicator, provided that the screen planes coincide with the plane of the ground of the aerodrome—in normal navigation on sea or on water generally, the problem of entering a harbour or avoiding collision of one ship with another ship, or the problem of keeping suitable distance from marked flats requires distance determination between the ship and the point or region to be reached or to be avoided.

It appears from the enumeration, that there are many problems in the solution of which the invention may advantageously be used.

In order to further assist the understanding of the invention, some of its realisations are illustrated on the annexed drawing.

Figures 1 and 2 show merely diagrammatically in vertical section and in plan, viewed on a plane along section line 2—2 of Figure 1 respectively, a distance indicator according to the invention, as a guide for aircraft when landing on an aerodrome.

Fig. 3 is a diagrammatic representation of the phenomenon of superposition stripes presented by the device illustrated in Figs. 1 and 2 when viewed from a position above the same.

Fig. 4 is a plan view of a portable distance determination instrument for suitable connection to an object, to be used for instance in connection with photographic work.

In the embodiment shown in Figs. 1 and 2 $a$ designates a translucent glass plate covering a cavity in the ground of the aerodrome; $b$ are rods below plate $a$ which may be assumed as having a width amounting for instance to 2 millimetres and a length of say 1 metre. Such rods $b$ being arranged in juxtaposition, leaving a free space between them of say likewise 2 millimetres and covering a field of say 2½ metres in width. Below said row of rods $b$ at a distance of say about 30 centimetres there is mounted within said cavity parallelly to plate $a$ a second translucent plate $c$, provided at its upper surface with a set of parallel opaque strips $d$, for instance formed of dark paint and preferably of the same width (2 millimetres) as rods $a$ and at like distance from each other. Below plate $c$ there is provided a plate $e$ of milk glass forming a cover plate for a set of so-called neon-lamps or the like $f$, sending light rays through the interstices between the dark strips $d$ and the rods $b$. The system of rods $b$ and of dark strips $d$ are slightly angularly displaced with relation to each other, say for 1°. The pilot of an aircraft approaching the grid screen arrangement at the ground of the aerodrome in the direction transversely to the rods $b$ and strips $d$ is impressed by the light rays emitted from the neon-lamps $f$. The pilot perceives the optical phenomenon of superposition stripes $g$ (Fig. 3), whereas the rods band strips $d$, owing to the small interstices between them are not seen individually as long as the aircraft is still somewhat remote from the rod-strip arrangement. The stripes are more or less inclined with relation to the longitudinal direction of the stripes forming rods $b$ and strips $d$. A marking is provided at two crossing edges of plate $a$ as indicated in Figure 3 by the numerals 1, 2, 3, 4, 8 and ∞; these numerals indicate to the pilot of the aircraft the distance from ground in metres when the direction of the superposition stripes is such that a stripe crossing the point 0 meets a numeral mark for instance the numeral mark 2 as in Figure 3, whereby it would be indicated to the pilot that he is 2 metres above ground and this irrespective of his rectilinear distance from the distance indicating device.

The instrument illustrated in Figure 4 contains within a round box two parallel glass screens each with a system of rectilinear opaque lines and translucent interstices therebetween. The width of the lines and of the interstices may be 0.04 mm., and the distance of the screen plates 6 mm., and the angular displacement of the screen lines may be about one minute.

The casing $h$ is provided at its circular edge with a number of marks; marks $i$ and $k$ are so positioned with relation to the direction of the screen lines, that the line connecting the centres of the marks is substantially parallel to the lines of the screen-marks $l$, $m$, $n$, $o$, $p$, $q$, indicating distances of ½, 1, 2, 4, 8 and ∞ metres. The parallel stripes illustrated within the circular edge of the box or casing represent the superposition stripes perceived by the observer when looking on the instrument, whereas the screen lines remain invisible to him. The inclination of the stripes, shown in the figure, corresponds to a distance of one metre from the observer, when looking perpendicularly to the plane of the instrument.

What I claim is:

1. An optical device adapted to indicate to an observer the distance between the observer and the device, comprising a front system of rectilinear opaque strips or rods of like width fixed in spaced parallel relation in a single plane and having light-permeable interstices between them, a rear system of substantially identical construction arranged directly behind and in a plane parallel to and spaced a definite fixed distance from the plane of the front system, and means for transilluminating said systems, the front and rear systems being fixedly disposed with the rods or strips of one slightly angularly displaced with respect to those of the other and being spaced at such a distance apart as to cooperate upon transillumination thereof to present to an observer the phenomenon of superpositioned stripes the inclination of which is dependent upon and indicative of the distance of the observer from the device and the inclination of which varies in a predetermined manner with variation of the distance of the observer therefrom in a fixed direction.

2. An optical device adapted to indicate to an observer the distance between the observer and the device, comprising a front system of rectilinear opaque strips or rods of like width fixed in spaced parallel relation in a single plane and having light-permeable interstices between them, a rear system of substantially identical construction arranged directly behind and in a plane parallel to and spaced a definite fixed distance from the plane of the front system, the front and rear systems being disposed with the rods or strips thereof slightly angularly displaced with respect to each other, whereby upon transillumination thereof the phenomenon of superpositioned stripes is presented to the observer, the distance between the two systems and the relative angular displacement of the rods thereof being so fixed that the inclination of the superpositioned stripes bears a predetermined constant relation to the distance of the observer from the device, whereby the observer may determine by visual inspection of the inclination of the stripes the distance correlated therewith.

3. A portable optical device for visually indicating the distance between an observer and the device, comprising a casing a pair of transparent screen plates fixed in said casing in spaced parallel relation one in advance of the other, each of said screen plates provided with a system of rectilinear opaque strips of like width disposed in parallel spaced relation to each other, the strip system of one of said screen plates being slightly angularly displaced with respect to those of the other, the arrangement of said strips and the spacing of said screens being such as to present, on transillumination, to an observer, in a given direction, superpositioned stripes having predetermined positions of inclination indicative of the distance of the observer from the device, and fixed markings on said casing indicative of the distance represented by the different positions of inclination of the superpositioned stripes.

4. An optical aircraft landing guide adapted to be mounted in fixed relation to a landing field and to indicate visually to an observer on an approaching aircraft its distance therefrom, comprising two grating structures mounted in superposed fixed spaced relation to each other, each of said gratings comprising a plurality of parallel light-impermeable bars or strips arranged in the same plane in fixed spaced relation to each other to define light permeable interstices therebetween, means for transilluminating said grating structures, the two grating structures being disposed with the planes thereof transverse to the direction of approach of the landing aircraft and one behind the other as viewed in said direction with the bars of the one grating slightly angularly disposed with relation to those of the other, the relation of the bars of said gratings and of the gratings to each other being fixed to present to an observer in an aircraft approaching the landing field the phenomenon of superpositioned stripes the number and inclination of which vary predeterminedly with and indicate the distance from the observer to the landing field, whereby to indicate to the observer in an aircraft approaching the field in the direction of approach for landing the distance of the aircraft from the landing field by visible change in the number or inclination of the superpositioned stripes.

ERNST LAU.